United States Patent
Mita et al.

(10) Patent No.: US 6,904,996 B2
(45) Date of Patent: Jun. 14, 2005

(54) TRUCK AND TRANSMISSION GEARSHIFT OPERATION DEVICE THEREOF

(75) Inventors: Masayoshi Mita, Kanagawa (JP); Tadaharu Suga, Tochigi (JP); Hiroyuki Dohi, Kanagawa (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 0 days.

(21) Appl. No.: 10/447,411

(22) Filed: May 29, 2003

(65) Prior Publication Data

US 2003/0221503 A1 Dec. 4, 2003

(30) Foreign Application Priority Data

May 29, 2002  (JP) ........................................ 2002-155816

(51) Int. Cl.[7] ............................................. B60K 20/00
(52) U.S. Cl. ..................................................... 180/336
(58) Field of Search ............................... 180/336, 333, 180/334, 292, 293; 74/473.1

(56) References Cited

U.S. PATENT DOCUMENTS

| | | | | |
|---|---|---|---|---|
| 1,630,076 A | * | 5/1927 | Schmidt | 74/473.3 |
| 1,736,330 A | * | 11/1929 | Schmidt | 74/473.15 |
| 4,486,211 A | * | 12/1984 | Monaghan | 65/506 |
| 4,552,032 A | * | 11/1985 | Kanai | 74/473.15 |
| 5,137,106 A | * | 8/1992 | Allen et al. | 180/235 |
| 6,367,574 B1 | * | 4/2002 | Steiner | 180/333 |
| 2002/0007979 A1 | * | 1/2002 | Wilson | 180/292 |

FOREIGN PATENT DOCUMENTS

| | | | | |
|---|---|---|---|---|
| JP | 08188061 A | * | 7/1996 | B60K/20/02 |
| JP | 09-030282 | | 2/1997 | |

* cited by examiner

Primary Examiner—Faye M. Fleming
(74) Attorney, Agent, or Firm—Rossi, Kimms & McDowel

(57) ABSTRACT

A gearshift operation device for a tiltable cab over type truck comprises a shift lever placed at an instrument panel, and a select cable and a shift cable which connect an operation lever unit for the shift lever and a manual transmission. After coming out of a cab, the cables curve to pass close by a hinge pivot which supports the cab, and extend toward the manual transmission.

20 Claims, 4 Drawing Sheets

TRUCK AND TRANSMISSION GEARSHIFT OPERATION DEVICE THEREOF

BACKGROUND OF THE INVENTION

1. Field of the Invention

The invention relates to a gearshift operation device for a transmission installed in a tiltable cab over type truck.

2. Description of the Related Art

Generally, a passenger car has an engine room and a passenger compartment. The engine room contains an engine and a manual transmission, and the passenger compartment contains a driver seat and a shift lever for the manual transmission. The shift lever is placed near the driver seat and mechanically connected to the manual transmission through a link mechanism. With this gearshift operation device, a driver in the driver seat can shift the gear of the manual transmission by operating the shift lever manually.

The gearshift operation device disclosed in Japanese Patent No. 3191626 includes a shift lever placed at an instrument panel in the passenger compartment, and the operation of the shift lever is transmitted to the manual transmission through a select cable and a shift cable. The gearshift device of this type provides a large space under the instrument panel, or around a driver's feet in the passenger compartment. Thus, a driver or a passenger can easily move from the driver seat to a passenger seat next thereto or vice versa.

It is clear from the above patent publication that the above gearshift operation device only suits passenger cars. No consideration is given to applying it to a tiltable cab over type truck.

Specifically, a truck of this type has a cab which forms a passenger compartment, and an engine and a transmission are placed under the floor of the cab. The cab is joined to a vehicle body through a hinge pivot. Upon the hinge pivot, the cab can turn, or tilt forward of the vehicle body. Thus, when the cab is tilted, the engine and the transmission are exposed to the outside, so that they can undergo check, maintenance and the like.

When the cab is tilted this way, the distance between the cab and the transmission increases. Hence, the gearshift operation device disclosed in the above patent publication cannot be applied to the tiltable cab over type truck.

An object of the invention is to provide a gearshift operation device that can provide a large space inside the cab and allows the cab to be tilted.

SUMMARY OF THE INVENTION

In order to achieve the above object, a gearshift operation device for a transmission according to the invention comprises an operation lever unit placed inside an instrument panel, the operation lever unit having an operation lever protruding from the instrument panel; and a control cable for mechanically connecting the operation lever unit and the transmission to enable operation control over the transmission based on operation of the operation lever, the control cable allowing the cab to be tilted.

In this gearshift operation device, since the operation lever is placed at the instrument panel, a large space is provided in front of a driver seat and a passenger seat next thereto inside the cab.

Further, since the operation lever can be placed near a steering wheel, a driver can operate the operation lever easily.

The control cable allows the cab to be tilted. The tilted cab does not interfere with the control cable, and does not hinder check or maintenance of the engine and transmission.

The gearshift operation device may further comprise a support assembly for supporting the operation lever unit, and the support assembly can include a column support extending toward the center of a hinge pivot which supports the cab, from the operation lever unit up to the floor of the cab. The control cable comprises an inside part which extends inside the cab, from the operation lever unit up to the floor, and an outside part which extends from the floor up to the transmission. The outside part passes close by the hinge pivot.

Specifically, the outside part of the control cable curves to pass close behind the hinge pivot as viewed in the front-to-rear direction of the cab. When the cab is tilted, the curving part of the control cable is unbent to thereby allowing the cab to be tilted.

Since the outside part of the control cable passes close by the hinge pivot, the radius of curvature of the curving part of the control cable is kept large. This reduces force exerted on the control cable and resistance to operation of the operation lever. As a result, the operation feeling about the operation lever improves.

Desirably, the curving part of the outside part of the control cable forms a downward convex curve. In this case, the gearshift operation device further comprises a connecting bracket for connecting the hinge pivot and the curving part of the control cable. The connecting bracket is rotatably supported on the hinge pivot.

In the case of this arrangement, when the cab is tilted, the connecting bracket moves around the hinge pivot. As the connecting bracket moves, the curving part of the control cable is unbent smoothly and stably. Conversely, when the cab is returned from the tilted position to the normal position, the curving part of the control cable is reproduced stably.

The inside part of the control cable can extend along the column support, near the column support. Further, the support assembly comprises a shift bracket in the form of a plate, which connects the operation lever unit and the column support. The shift bracket has an opening to let the control cable through.

In this case, the inside part of the control cable can extend from the operation lever unit to the floor of the cab, linearly. This further reduces force exerted on the control cable and resistance to operation of the operation lever.

The shift bracket is of a trapezoidal shape, and the front end of the shift bracket is larger in width than the rear end thereof as viewed in the front-to-rear direction of the cab. In this case, the shift bracket has enough rigidity in spite of its opening, and can be small in size. This increases the freedom to determine the design of appearance of the instrument panel.

The cab further comprises a windshield rail for supporting a windshield, and an inner panel frame provided inside the instrument panel for supporting the instrument panel. In this case, the support assembly can further comprise a first connecting member for connecting the front end of the shift bracket and the windshield rail, and a second connecting member for connecting the front end of the shift bracket and the inner panel frame. Since the operation lever unit is supported on the side of the cab by means by not only the column support but also the first and second connecting members, the stiffness of fitting of the operation lever unit increases, which allows the operation lever to be operated smoothly.

The column support can have a lower end part bent forward of the cab, and the first connecting member can have a fragile part which helps the first connecting member buckle when impact is exerted on the cab in the front-to-rear direction of the cab.

In the case of this arrangement, when impact is exerted on the cab, the column support further bend forward at its bent part, and the first connecting member buckles at the same time. As a result, the shift bracket shifts forward of the cab, which prevents part of a driver's body, for example, his or her knee colliding badly against the shift bracket or the column support.

The second connecting member can support the shift bracket elastically relative to the inner panel frame. In this case, when the operation lever is operated, vibration and vibration noise transmitted to the instrument panel is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the invention, and wherein.

DETAILED DESCRIPTION OF THE PREFERRED EMBODIMENTS

Figure 1:
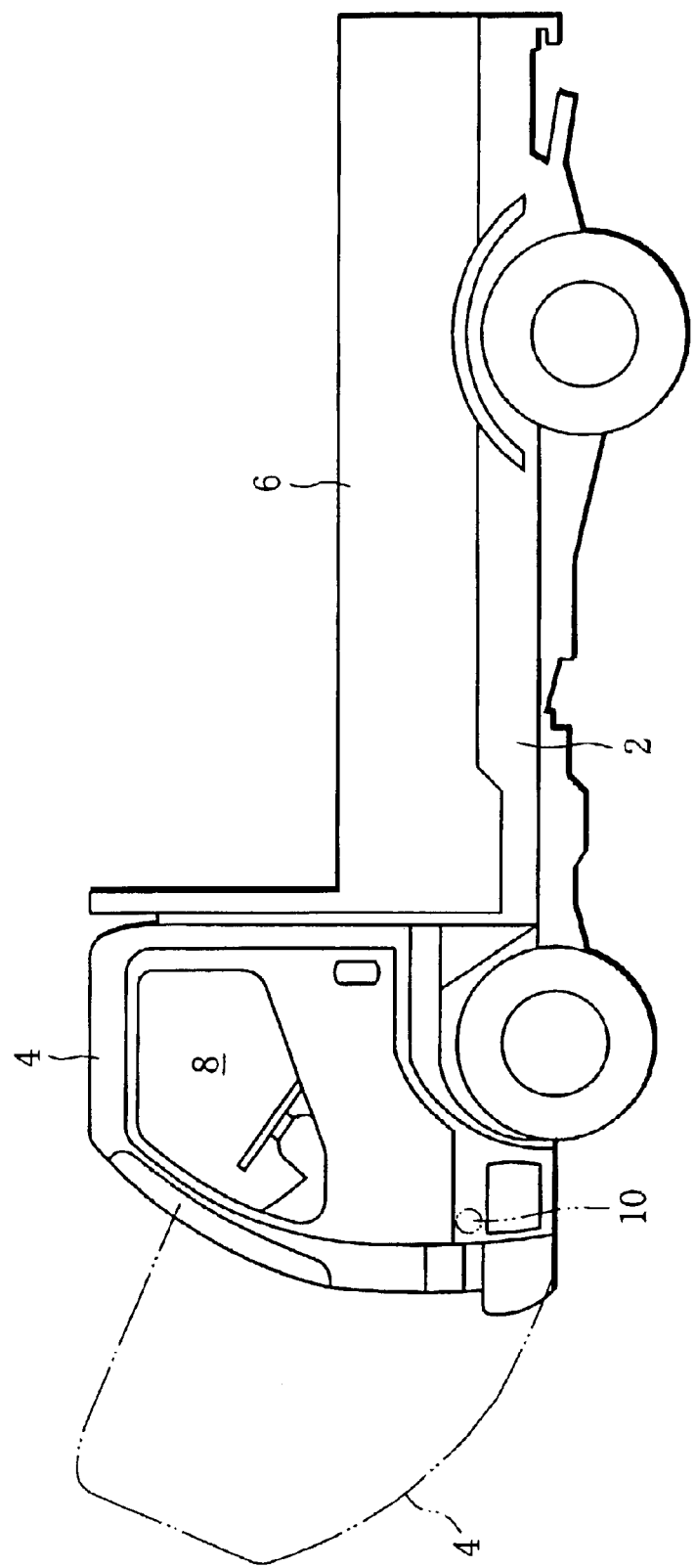
FIG. 1 is a side view of a tiltable cab over type truck.

FIG. 1 shows a tiltable cab over type truck. The truck has a vehicle body 2, a cab 4 placed at a front part of the vehicle body 2, and a cargo bed 6 placed at a rear part of the vehicle body 2. The cab 4 defines a passenger compartment 8 inside, and is supported through a hinge pivot 10 fitted to the vehicle body 2. Thus, as indicated by a two-dot chain line in FIG. 1, the cab 4 can turn, or tilt upon the hinge pivot 10 forward of the truck.

Figure 2:
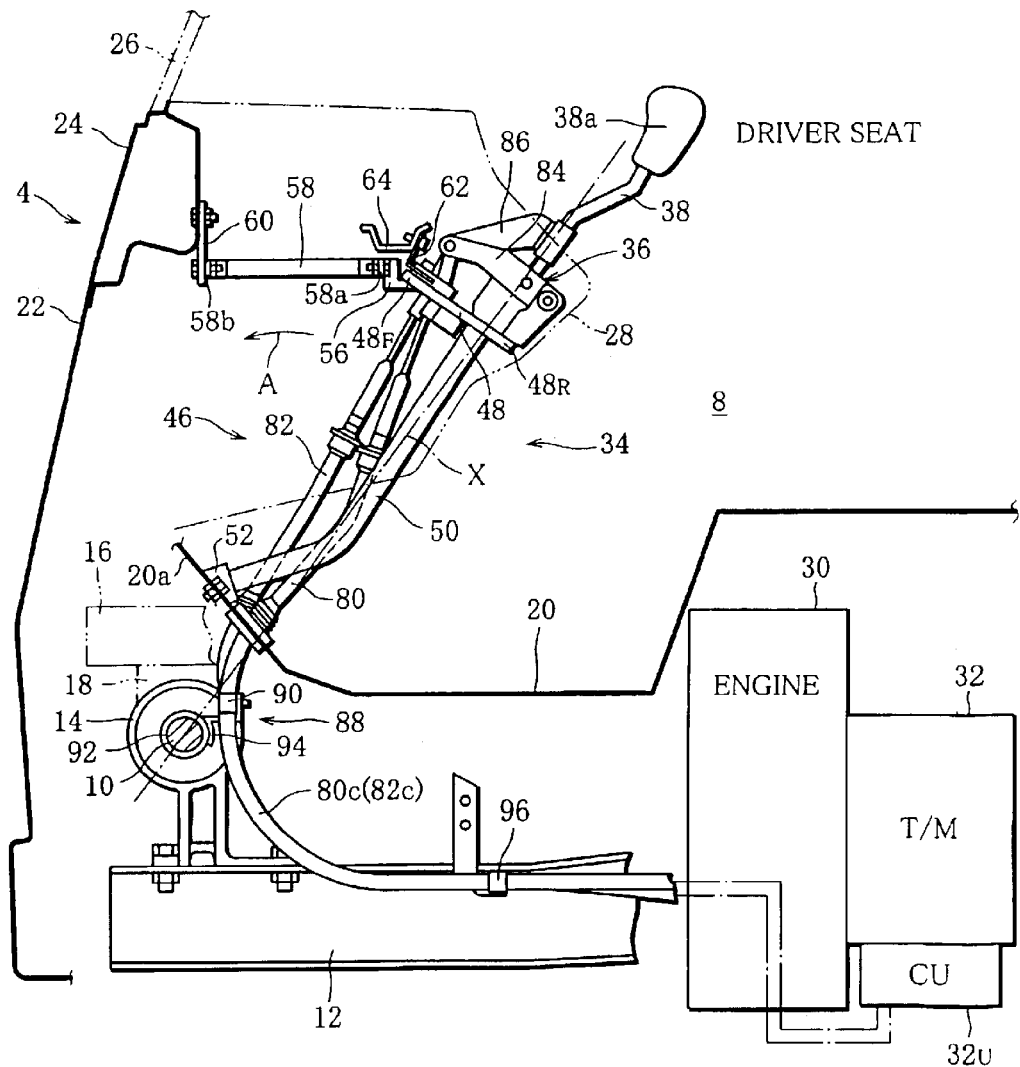
FIG. 2 is a side view showing an embodiment of a gearshift operation device.

More specifically, as shown in FIG. 2, the vehicle body 2 has a pair of side rails which form a body frame. The side rails 12 are placed on the left and right sides of the vehicle body 2, and extend parallel to each other, lengthways of the vehicle body 2, namely, in the front-to-rear direction of the vehicle body 2.

A hinge bracket 14 is attached to the front end of each side rail 12. The hinge brackets 14 support the hinge pivot 10 at the opposite ends thereof.

The cab 4 has a pair of main sills 16 indicated by a two-dot chain line. The main sills 16 are located above the side rails 12, and extend along the side rails. At their respective front ends, the main sills 16 are supported on the hinge pivot 10 through brackets 18, so that the main sills 16 can turn around the hinge pivot 10.

The cab 4 has a floor 20 supported by the main sills 16. The floor 20 is joined to a front panel 22 of the cab 4. To the front panel 22 is attached a windshield rail 24. The windshield rail 24 supports a windshield 26 at its lower edge.

Inside the passenger compartment 8, the windshield rail 24 is covered with an instrument panel 28 indicated by a two-dot chain line. The instrument panel 28 extends along the width of the cab 4. The instrument panel 28 is used for various meters, switches and the like to be arranged on.

The passenger compartment 8 has a driver seat and a passenger seat (not shown) inside. The driver seat and the passenger seat are placed on the floor 20, side by side, facing the instrument panel 28.

Under the floor 20 of the cab 4, an engine 30 and a manual transmission 32 are placed in a tandem formation. The engine 30 and the manual transmission 32 are supported by the side rails 12. Power produced by the engine 30 is transmitted through the manual transmission 32 and a power transmission path to left and right rear wheels.

Thus, a gearshift operation device 34 for the manual transmission 34 includes an operation lever unit 36. The operation lever unit 36 is placed inside the instrument panel 28, and has a shift lever 38. The shift lever 38 projects through the front of the instrument panel 28, and has a knob 38a at its upper end. The knob 38a is placed at a position which is easy for a driver in the driver seat to access.

Figure 3:
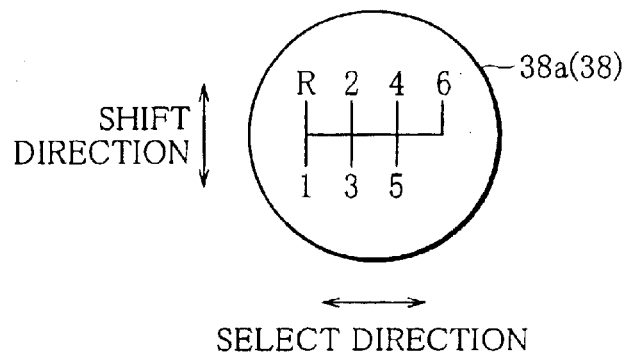
FIG. 3 is an illustration showing a knob of a shift lever.

More specifically, the manual transmission 32 has five or six shift stages for forward travelling and one shift stage for reverse travelling. As shown in FIG. 3, the shift lever 38 can be moved in the select direction, namely, from the left to the right and vice versa, and in the shift direction, namely, from the front to the rear and vice versa. Thus, the operation lever unit 36 includes a link mechanism which enables the shift lever 38 to be operated this way. The operation lever unit 36 is supported by a supporting assembly 46 fitted to the cab 4.

The supporting assembly 46 includes a shift bracket 48 to which the operation lever unit 36 is mounted. The shift bracket 48 is an iron plate.

The shift bracket 48 is supported on a column support 50. Specifically, the upper end of the column support 50 is joined to the rear end $48_R$ of the shift bracket 48 as viewed in the front-to-rear direction of the cab 4.

The column support 50 is an iron pipe. The column support extends inside the instrument panel 28 straight, from the shift bracket 48 toward a forward lower position, and projects beyond the under surface of the instrument panel 28. Outside the instrument panel 28, the lower end part of the column support 50 is bent forward, and the lower end of the column support 50 is fixed to the front part 20a of the floor 20 using a bracket 52 and bolts and nuts. The front part 20a of the floor 20 rises upward and continues to the under surface of the instrument panel 28.

The upper part, or the straight part of the column support 50 has an axis X. The axis X crosses the axis of the hinge pivot 10 or passes close by it.

Figure 4:
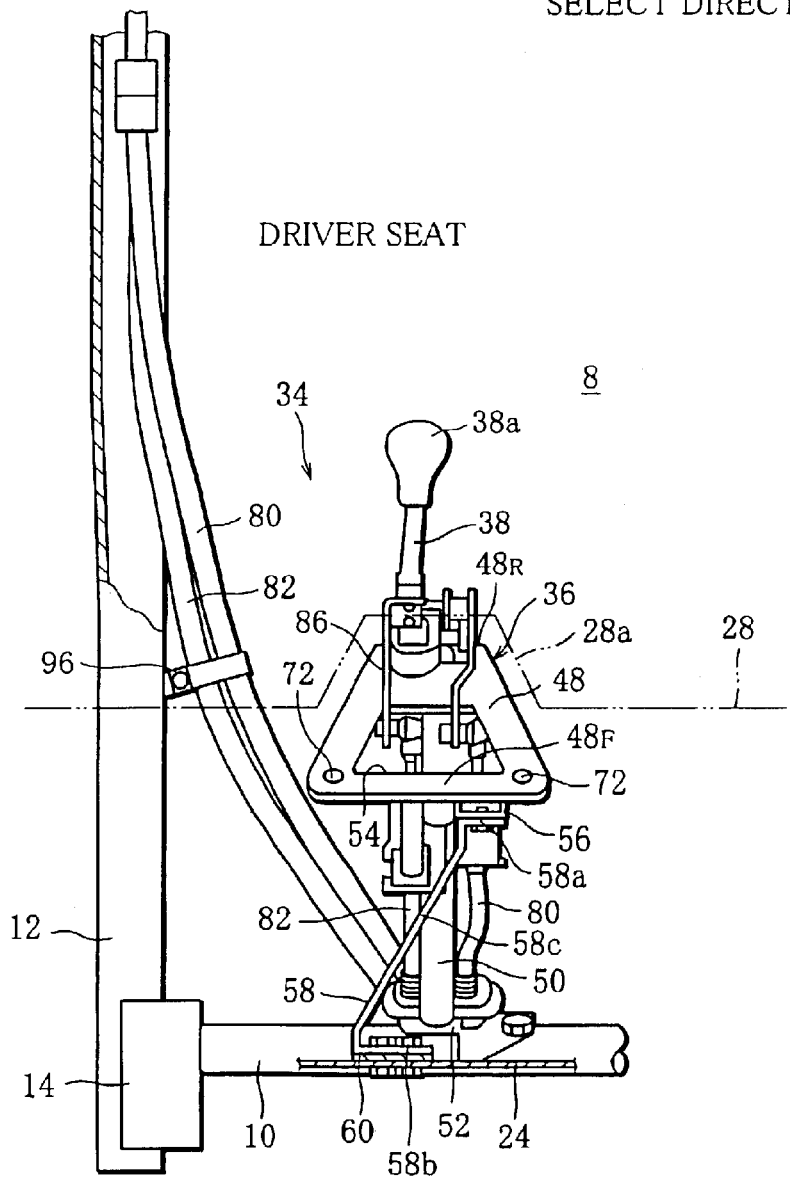
FIG. 4 is a plan view of the system shown in FIG. 2.

As shown in FIG. 4, the shift bracket 48 has a front end $48_F$ which is larger in width than the rear end $48_R$. Thus, when viewed from above, the shift bracket 48 is a trapezoidal shape.

An opening 54 is formed in the front end part of the shift bracket 48. Also the opening 54 is of a trapezoidal shape similar to the shape of the shift bracket 48. Although the opening 54 is formed in the shift bracket 48 this way, the shift bracket 48 has enough rigidity because of its trapezoidal shape. Also because of its trapezoidal shape, the shift bracket 48 can be smaller in size.

As clearly shown in FIG. 4, the front of the instrument panel 28 includes a swelling part 28a projecting toward the driver seat. The operation lever unit 36 and the rear end part of the shift bracket 48 are placed inside the swelling part 28a.

Since the shift bracket 48 is of the above-described trapezoidal shape, the rear end part of the shift bracket 48 is small. Thus, the rear end part of the shift bracket 48 can be placed inside the swelling part 28a easily. This leads to the advantage that the size of the swelling part 28a can be determined freely, which increases the freedom of design of the front of the instrument panel 28.

The shift bracket 48 and the above-mentioned windshield rail 24 are connected by a first connecting member. The first connecting member includes a bracket 56 welded to the under surface of the front end $48_F$ of the shift bracket 48. The bracket 56 is a U shape as viewed from above, and projects forward from the shift bracket 48.

As shown in FIGS. 1 and 2, an end 58a of a stay 58 is connected to the bracket 56 by bolts and nuts, while the opposite end 58b of the stay 58 is connected to a bracket 60 by bolts and nuts. The bracket 60 is fixed to the windshield rail 24 by bolts and nuts.

The stay 58 is a strip-like steel plate, and extends between the brackets 56 and 60, horizontally, in the front to-rear direction of the cab 4. More specifically, as clearly shown in FIG. 4, the stay 58 has vertical surfaces, and the opposite ends 58a and 58b are bent in the same direction regarding the direction along the width of the cab 4 and connected to the brackets 56 and 60, respectively. The opposite ends 58a and 58b of the stay 58 are located at positions which are different in the direction along the width of the cab 4. The intermediate part 58c of the stay 58 extends at an angle to the front-to-rear direction of the cab 4.

Due to this shape of the stay 58, that part of the stay 58 which connects the end 58a and the intermediate part 58c and that part of the stay 58 which connects the end 58b and the intermediate part 58c are fragile. Thus, when impact is exerted on the cab 4 from the front, the stay 58 buckles at these fragile parts and bends easily.

As described above, the lower end part of the column support 50 is bent forward. Thus, when impact is exerted on the cab 4, also the column support 50 changes its shape easily.

Hence, when impact is exerted on the cab 4, the stay 58 and the column support 50 change their shapes, so that the shift bracket 48 shifts forward as indicated by an arrow A in FIG. 2. As a result, when impact is exerted, a situation such that parts of a driver's body, for example, his or her knee moves forward from the driver seat and collides badly against the shift bracket 48 or the column support 50 can be avoided.

As described above, the shift bracket 48 is supported by the column support 50 fitted to the floor 20, and at the same time supported by the first connecting member, namely, by the stay 58 fitted to the windshield rail 24. Thus, the stiffness of fitting of the operation lever unit 36 is enough to ensure the smooth operation of the shift lever 38.

To sum up, the above-described support assembly 46 ensures both the smooth operation of the shift lever 38 and the reduction of force exerted on a driver's knees when impact is exerted on the cab.

As shown in FIG. 2, the shift bracket 48 is also connected to an inner panel frame 64 through a second connecting member. The inner panel frame 64 extends inside the instrument panel 28 and supports the instrument panel 28.

Figure 5:
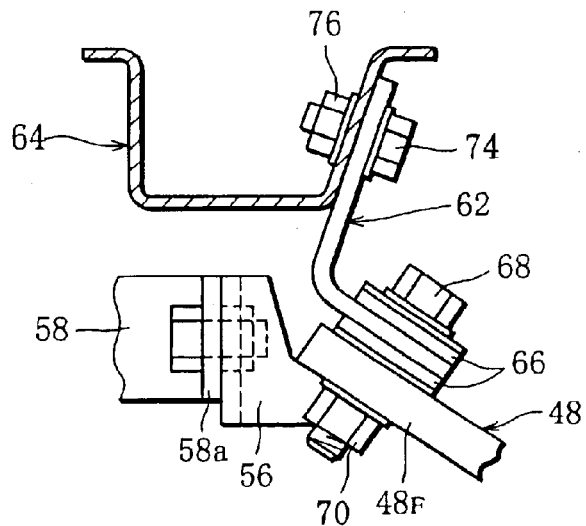
FIG. 5 is an illustration showing part of FIG. 2 on an enlarged scale.

FIG. 5 shows the details of the second connecting member. The second connecting member has an L-shaped bracket 62, which connects the front end $48_F$ of the shift bracket 48 and the inner panel frame 64.

More specifically, the lower end of the bracket 62 is tightly held by a pair of rubber mounts 66. The lower end of the bracket 62 and the rubber mounts 66 are fastened to the front end $48_F$ of the shift bracket 48 by two set of bolts 68 and nuts 70. More specifically, through-holes 72 (see FIG. 4) are formed in the front end $48_F$ of the shift bracket 48 in its left and right corners, and bolts 68 are passed through the through holes 72.

The upper end of the bracket 62 is fastened to the inner panel frame 64 by bolts 74 and nuts 76.

As described above, the shift bracket 48 is connected to the inner panel frame 64 through the rubber mounts 66, elastically. Thus, when the shift lever 38 is operated, vibration and vibration noise transmitted from the operation lever unit 36 to the instrument panel 28 is blocked by the rubber mounts 66, so that the vibration isolating properties and sound insulation properties of the instrument panel 28 improve.

Referring back to FIG. 2, a select cable 80 and a shift cable 82 extend from the operation lever unit 36. The select cable 80 and the shift cable 82 are push-pull cables, and mechanically connect the operation lever unit 36 and the manual transmission 32.

More specifically, the select cable 80 and the shift cable 82 each comprise an inside part which extends inside the cab and an outside part which extends outside the cab 4. The respective inside parts of the select cable 80 and the shift cable 82 are connected to the operation lever unit 36.

Specifically, the link mechanism of the operation lever unit 36 includes a select link 84 and a shift link 86. The select link 84 turns in accordance with the movement of the shift lever 38 in the select direction, while the shift link 86 turns in accordance with the movement of the shift lever 38 in the shift direction. An end of the select cable 80 is connected to the select link 84, while an end of the shift cable 82 is connected to the shift link 86.

As clearly shown in FIG. 4, the inside parts of the cables 80 and 82 pass through the opening 54 of the above-described shift bracket 48, and extend downward, along the column support 50, on the opposite sides of the column support 50.

The cables 80 and 82 then pass through the front part 20a of the floor 20 and are drawn out of the cab 4, downward. Here, it is so arranged that the cables 80 and 82 pass through the floor 20 at a position close to the axis X of the column support 50.

As clearly shown in FIG. 2, under the floor 20, the outside parts of the cables 80 and 82 curve gently to pass close behind the hinge pivot 10.

Then, as clearly shown in FIG. 4, the outside parts of the cables 80 and 82 extend toward one of the side rails 12, and then extend along the side rail 12 up to the manual transmission 32. The outside ends of the cables 80 and 82 are connected to the shift assembly $32_U$ of the manual transmission 32. By operating the shift lever 38, the shift assembly $32_U$ is operated through the select cable 80 and shift cable 82, to shift the gear of the manual transmission 32.

The curving parts 80c and 82c of the cables 80 and 82 are supported by a connecting bracket 88 which is supported on the hinge pivot 10. Specifically, the connecting bracket 88 comprises a binding band 90 for binding the cables 80 and 82 together, a ring 92 rotatably fitted around the hinge pivot 10, and a connecting member 94 for connecting the ring 92 and the binding band 90.

The cables 80 and 82 are further fixed to the side rail 12 by a stopper 96, at a downstream position of their curving parts 80c and 82c.

As clearly shown in FIG. 2, the shift lever 38 is placed at the instrument panel 28, and the select cable 80 and the shift cable 82 come out of the instrument panel 28 from its under surface and pass through the front part 20a of the floor 20. Hence, a large space is made in front of the driver seat in the passenger compartment 8, which allows a driver or a passenger to easily move from the driver sheet to the passenger seat or vice versa.

Further, since the shift lever 38 is placed at the instrument panel 28, the driver can operate the shift lever 38 easily. Thus, the operation feeling about select operation and shift operation improves.

Further, since the curving parts 80c and 82c of the select cable 80 and shift cable 82 pass close by the hinge pivot 10, the radius of curvature of the curving parts 80c, 82c is kept large. Hence, when the shift lever 38 is operated, the curving parts 80c and 82c do not form large resistance to the operation of the shift lever 38 but allow the shift lever 38 to be operated smoothly.

Further, as described above, the inside parts of the cables 80 and 82 extend rectilinearly. Thus, the inside parts of the cables 80, 82 do not form large resistance to the operation of the shift lever 38, either.

As mentioned above, when the engine 30, the manual transmission 32 and the like undergo check and maintenance, the cab 4 is tilted forward upon the hinge pivot 10 (see FIG. 1). In that case, as the cab 4 is tilted, the select cable 80 and the shift cable 82 are both drawn toward the cab 4.

Figure 6:
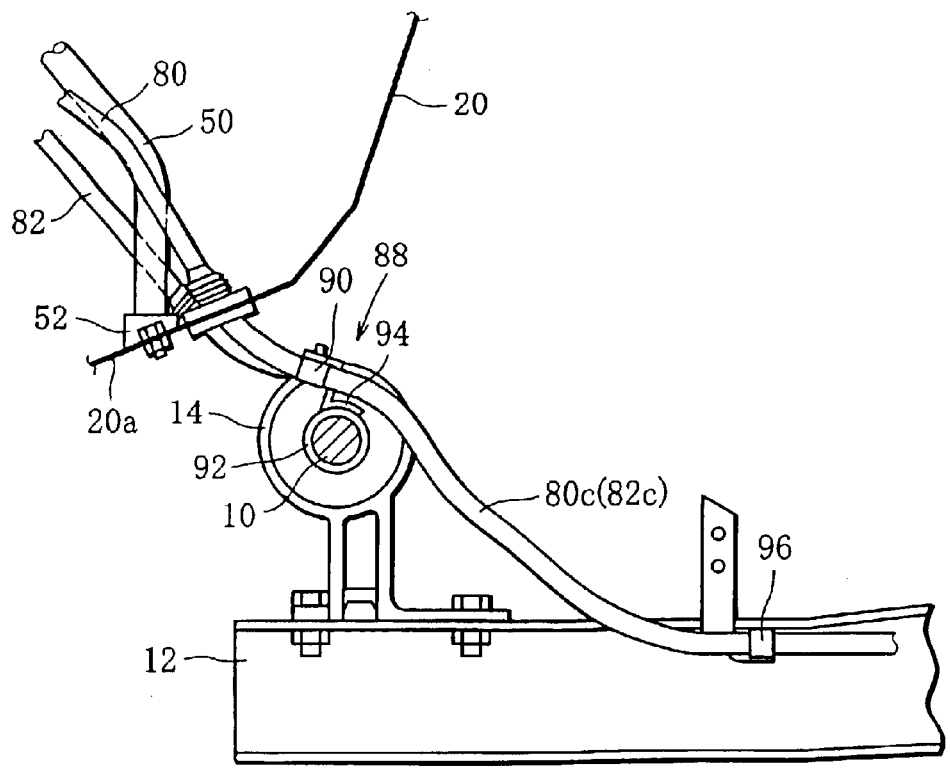
FIG. 6 is an illustration showing how cables are when a cab is tilted.

However, the connecting bracket 88 for the cables 80 and 82 can turn relative to the hinge pivot 10. Thus, when the cables 80 and 82 are drawn, the connecting bracket 88 moves along the circumference of the hinge pivot 10 with the curving parts 80c and 82c, so that the curving parts 80c and 82c of the cables 80 and 82 are unbent linearly, as shown in FIG. 6. To sum up, when the cab 4 is tilted, the distance between the front part 20a of the floor 20 of the cab 4 and the stopper 94 increases. However, this increase of the distance is tolerated by the curving parts 80c and 82c of the cables 80 and 82 being unbent linearly.

When the cab 4 is returned from the tilted position to the original position, the connecting bracket 88 for the cables 80 and 82 moves along the circumference of the hinge pivot 10 in the reverse direction, so that the curving parts 80c and 82c of the cables 80 and 82 are reproduced stably.

Thus, even when the cab 4 is tilted, the curving parts 80c and 82c of the cables 80 and 82 just move around the hinge pivot 10, where the distance they move is short, and excessive force is never exerted on the curving parts 80c and 82c.

Further, inside the cab 4, the cables 80 and 82 pass through the opening 54 of the shift bracket 48 and then extend on the opposite sides of the column support 50. Thus, the cables 80 and 82 are prevented from getting tangled with each other or interfering with other devices and members when the cab 4 is tilted.

The present invention is not limited to the above embodiment, but various modifications can be made.

The gearshift operation device according to the invention can be applied to not only the above-described manual transmission 32 but also an automatic transmission in like manner.

What is claimed is:

1. A gearshift operation device for a truck having a vehicle body to which an engine and a transmission are installed, a tiltable cab placed over the engine and the transmission, and supported by a hinge pivot mounted to the vehicle body and tiltable forward of the vehicle body, and an instrument panel placed inside the cab, said gearshift operation device comprising:

an operation lever unit configured to be placed inside said instrument panel, and having an operation lever protruding from said instrument panel;

a control cable for mechanically connecting said operation lever unit and said transmission to enable operation control over said transmission based on operation of said operation lever, while allowing the cab to be tilted, wherein said control cable has an externally extending portion adapted to extend externally from said instrument panel to the transmission; and a connecting bracket for rotatably suoporting the externally extending portion of said control cable about said hinge pivot.

2. A gearshift operation device for a truck having a vehicle body to which an engine and a transmission are installed, a tiltable cab placed over the engine and the transmission, and supported by a hinge pivot mounted to the vehicle body and tiltable forward of the vehicle body, and an instrument panel placed inside the cab, said gearshift operation device comprising:

an operation lever unit configured to be placed inside said instrument panel, and having an operation lever protruding from said instrument panel;

a control cable for mechanically connecting said operation lever unit and said transmission to enable operation control over said transmission based on operation of said operation lever, while allowing the cab to be tilted;

a support assembly for supporting said operation lever unit, said support assembly including a column support adapted to extend toward a center of said hinge pivot, from said operation lever unit to a floor of the cab, wherein said control cable comprises an inside part adapted to extend inside the cab, from said operation lever unit to said floor, and an outside part adapted to extend from said floor to said transmission, said outside part passing close by said hinge pivot.

3. The device according to claim 2, wherein the outside part of said control cable is adapted to curve pass closely behind said hinge pivot as viewed in the front-to-rear direction of the cab.

4. The device according to claim 3, wherein the curving part of said outside part of the control cable is adapted to form a downward convex curve, and said device further including a connecting bracket for connecting said hinge pivot and the curving part of said control cable, wherein said connecting bracket is adapted to rotatably supported on said hinge pivot.

5. The device according to claim 3, wherein the inside part of said control cable is adapted to extend along said column support, near said column support.

6. The device according to claim 5, wherein said support assembly further comprises a shift bracket in the form of a plate for connecting said operation lever unit and said column support, said shift bracket having an opening to permit passage of said control cable therethrough.

7. The device according to claim 6, wherein said shift bracket is of a trapezoidal shape, and the front end of said shift bracket is larger in width than the rear end thereof as viewed in the front-to-rear direction of the cab.

8. The device according to claim 7, wherein the cab further comprises a windshield rail for supporting a windshield, and an inner panel frame provided inside said instrument panel and supporting said instrument panel, and said support assembly further comprises a first connecting member for connecting the front end of said shift bracket and the windshield rail, and a second connecting member for connecting the front end of said shift bracket and the inner panel frame.

9. The device according to claim 7, wherein said column support has a lower end part bent forward of the cab.

10. The device according to claim 8, wherein the first connecting member has a fragile part for bucking the first connecting member upon impact to the cab in the front-to-rear direction of the cab.

11. The device according to claim 8, wherein the second connecting member is for supporting said shift bracket elastically relative to the inner panel frame.

12. A truck comprising:
an engine;
a transmission coupled to the engine;
a vehicle body supporting the engine and the transmission;
a tiltable cab placed over the engine and the transmission;
a hinge pivot mounted to the vehicle body for tiltably supporting the tiltable cab;
an instrument panel placed inside the cab; and
gearshift operation device comprising:
an operation lever unit placed inside the instrument panel, and having an operation lever protruding from the instrument panel; and
a control cable mechanically connecting the operation lever unit and the transmission to enable operation control over the transmission based on operation of the operation lever, while allowing the cab to be tilted, wherein the control cable has an externally extending portion that extends externally of the instrument panel to the transmission,
wherein the externally extending portion of the control cable is rotatably supported about the hinge pivot.

13. The truck according to claim 12, further including a connecting bracket rotatably supported on the hinge pivot and supporting the externally extending portion of the control cable.

14. The truck according to claim 12, further including a support assembly that supports the operation lever unit, the support assembly having a column support extending toward a center of the hinge pivots from the operation lever unit to a floor of the cab.

15. The truck according to claim 14, wherein the support assembly further includes a shift bracket in the form of a plate to connect the operation lever unit and the column support, the shift bracket having an opening to permit passage of the control cable therethrough.

16. The truck according to claim 14, wherein the shift bracket has a trapezoidal shape, and a front end of the shift bracket is larger in width than a rear end thereof as viewed in the front-to-rear direction of the cab.

17. The truck according to claim 14, wherein the cab further includes a windshield rail for supporting a windshield, and an inner panel frame provided inside the instrument panel and supporting the instrument panel, and said support assembly further includes a first connecting member connecting a front end of the shift bracket and the windshield rail, and a second connecting member connecting the front end of the shift bracket and the inner panel frame.

18. The truck according to claim 14, wherein the column support has a lower end part bent forward of the cab.

19. The truck according to claim 17, wherein the first connecting member has a fragile part for buckling the first connecting member upon impact to the cab in the front-to-rear direction of the cab.

20. The truck according to claim 17, wherein the second connecting member supports the shift bracket elastically relative to the inner panel frame.

* * * * *